United States Patent [19]

Merrill

[11] 4,379,902

[45] Apr. 12, 1983

[54] PROCESS FOR PRODUCING A LOW VISCOSITY SILICONE RESIN

[75] Inventor: Duane F. Merrill, Ballston Spa, N.Y.

[73] Assignee: General Electric, Waterford, N.Y.

[21] Appl. No.: 298,226

[22] Filed: Aug. 31, 1981

Related U.S. Application Data

[63] Continuation of Ser. No. 126,062, Feb. 29, 1980, which is a continuation of Ser. No. 750,993, Dec. 15, 1976, abandoned, which is a continuation of Ser. No. 630,848, Nov. 10, 1975, Pat. No. 4,026,868.

[51] Int. Cl.³ .............................................. C08G 77/06
[52] U.S. Cl. ...................................... 528/18; 524/413; 524/425; 524/432; 528/12
[58] Field of Search ............................ 528/10, 12, 18; 524/413, 425, 432

[56] References Cited

U.S. PATENT DOCUMENTS 3,666,830  5/1972  Alekna ............................... 252/430

Primary Examiner—Melvyn I. Marquis

[57] ABSTRACT

A process for producing a low viscosity silicone resin which comprises hydrolyzing halosilanes in a heterogeneous hydrolysis mixture of water, acetone and a water-immiscible solvent where the critical aspects of the process are the addition of the chlorosilanes to the hydrolysis medium by first mixing them with a portion of the acetone and adding them to the hydrolysis mixture over a period of at least 40 minutes and maintaining the temperature of said hydrolysis medium such that it does not exceed 45° C. The silicone resins produced by this process are useful in producing molding compositions having a low coefficient of thermal expansion.

12 Claims, No Drawings

PROCESS FOR PRODUCING A LOW VISCOSITY SILICONE RESIN

This application is a continuation of application Ser. No. 126,062, filed Feb. 29, 1980 which is a continuation of Ser. No. 750,993 filed Dec. 15, 1976 (abandoned) which is a continuation of Ser. No. 630,848 filed Nov. 11, 1975 now U.S. Pat. No. 4,026,868.

BACKGROUND OF THE INVENTION

The present invention relates to a process for producing silicone resins and more specifically the present invention relates to a process for producing silicone resins with a viscosity that does not exceed 100 centipoise at 140° C.

Silicone resins produced with the use of a hydrolysis medium of acetone, a water-immiscible organic solvent and water are the basis of the invention disclosed in Merrill Ser. No. 628,001, filed Nov. 3, 1975, now abandoned, which slicone resins produced by such a process are disclosed as useful for molding applications. Such silicone resins produced in accordance with the above disclosure of the above patent application are useful for the production of most molded parts and molding applications as well as other silicone resin applications. However, it was found that when such silicone resins were used to produce molded parts for encapsulating intricate electrical components that at times the molded silicone resin covering would craze or crack during the fabrication and specifically during the final curing of the encapsulated part.

Accordingly, it was found that such silicone resin molding composition did not have as low a coefficient of thermal expansion as would be desired. It can be appreciated that the lower the coefficient of thermal expansion is of the silicone resin molding composition the less it will expand or change shape during the curing steps and accordingly the less the likeliness that it will craze or crack.

As background, it should be appreciated that silicone resin molding compositions usually comprise a silicone resin, a filler and a curing catalyst system, the curing catalyst system usually being some form of lead compounds. However, the portion of the silicone resin molding composition that is most affected by temperature changes so as to increase or decrease in size with a change of temperature is the silicone resin. In prior art compositions, it was usually typical to include in quantity sufficient silicone resin such that there was present 25 to 30% by weight of the composition of silicone resin in order to obtain the proper strength in the encapsulating molding composition.

Accordingly, it was postulated with the above discussion that by decreasing the amount of silicone resin in the molding composition to 15 to 20% by weight of the total composition that the desired low coefficient of thermal expansion could be obtained.

However, the resin produced by the foregoing Merrill process as disclosed in that particular case could not be utilized at such low concentrations since it does not result in a final molded part of optimum tensile strength.

Another difficulty with the silicone resin as disclosed generally in the foregoing Merrill application is that after the filler and catalyst have been mixed into it and prior to being injected into the mold to encapsulate the electrical component, it was found to have too high a viscosity, such viscosity in many cases being in the range of about 600 centipoise or above at 140° C. Such high viscosity resins and molding compositions made it very difficult in the time limit of the automated operation to completely fill the mold with the silicone resin molding composition, and accordingly a sizable number of faulty parts can be produced.

Accordingly, it was also highly desirable to produce a silicone resin of a low viscosity such as a viscosity of 100 centipoise or less at 140° C., such that the silicone resin molding composition could be easily inserted into a mold to completely fill the mold in an automated process.

Accordingly, it is one object of the present invention to provide for a process that produces a silicone resin of low viscosity, that is, a viscosity that does not exceed 100 centipoise at 140° C.

It is another object of the present invention to provide for a process for producing a silicone resin that has good physical properties.

It is an additional object of the present invention to provide for a molding composition that has an exceptionally low viscosity.

It is yet an additional object of the present invention to provide for a molding composition with low coefficient of thermal expansion.

These and other objects of the present invention are accomplished by means of the disclosure set forth hereinbelow.

SUMMARY OF THE INVENTION

In accordance with the above objects, there is provided by the present invention a process for producing a silicone resin which has a viscosity that does not exceed 100 centipoise at 140° C., comprising (A) adding with continuous agitation a mixture of acetone and organohalosilanes over a period of at least 40 minutes to a heterogeneous hydrolysis mixing having a water phase and an organic phase composed of water, acetone and a water-immiscible solvent wherein in the final heterogeneous hydrolysis mixture, per part by weight of organohalosilanes there is present (1) from at least 1.7 parts to about 10 parts of water, (2) from about 0.2 to about 5 parts of acetone, (3) from about 0.3 to about 5 parts of a water-immiscible organic solvent, and (4) from 0 to about one mole of an aliphatic monohydric alcohol having from 1 to 8 carbon atoms per mole of halogen attached to the silicone atom of said organohalosilane, (B) maintaining the temperature of said heterogeneous hydrolysis mixture below 45° C. during step (A);

(C) removing the water from said heterogeneous hydrolysis mixture and reducing the acid content of the organic phase containing the formed silicone resin to below 5 parts per million; and (D) stripping of the solvent at a temperature not to exceed about 120° C. to yield a polyorganosiloxane having an average ratio from about 1 to 1.8 organo radicals per silicon atom, said organohalosilanes in step (A) being selected from the class consisting of, (a) a mixture of organotrihalosilanes and diorganodihalosilanes; (b) a reaction product of an aliphatic monohydric alcohol having from 1 to 8 carbon atoms and a mixture organotrihalosilanes and diorganodihalosilanes which reaction product may have up to one alkoxy radical substituted for each halogen radical in said organotrihalosilane and diorganodihalosilane; (c) a mixture of the reaction product of (b) and a member selected from the organotrihalosilane and diorganodihalosilane and where the organo radicals of said organohalosilanes are selected from the class consisting of monovalent hydrocarbon radicals and halogenated monovalent hydrocarbon radicals.

The basic aspects of the above process are that the organosilanes are first mixed with acetone before being added to the heterogeneous hydrolysis medium and that they are added to the heterogeneous hydrolysis mixture over a period of at least 40 minutes and wherein during such addition and for a reasonable period subsequent thereto at the end of the addition, the heterogeneous hydrolysis mixture is maintained at a temperature below 45° C.

A molding composition may be produced by the process disclosed above by mixing the silicone resin with a filler and a curing catalyst where the silicone resin concentration and the molding composition are between 15 to 20% and preferably 18 to 20% by weight. With such a concentration the silicone resin molding composition has a low coefficient of thermal expansion and the encapsulating cured molding composition has an acceptable tensile strength.

DESCRIPTION OF THE PREFERRED EMBODIMENT

The organohalosilanes utilized in the present process are of two types—one an organotrihalosilane and the other a diorganodihalosilane, where the organo groups are selected from monovalent hydrocarbon radicals and halogenated monovalent hydrocarbon radicals. The halogen in such silanes is preferably chlorine. Examples of such monovalent hydrocarbon radicals and halongenated monovalent hydrocarbon radicals are alkyl radicals from 1 to 8 carbon atoms; cycloalkyl radicals of 5 to 10 carbon atoms; alkenyl radicals such as, vinyl, allyl and fluorinated substituted hydrocarbon radicals such as trifluoropropyl. For molding compositions, most preferably the organo radicals are selected from methyl and phenyl.

In the most preferred silicone resin that is produced by the present process, all the diorgano radicals in said diorganohalosilanes are methyl while the organo radicals in the organotrihalosilanes are selected from methyl and phenyl. In one most specific silicone resin produced by the process of the present invention, the ratio of methyl to phenyl radicals in the organotrihalosilane can vary from 1:1 to 2:1, while the mole percent of dimethyl substituent groups in the difunctional diorganodihalosilane reactant varies from 10 to 20 mole percent gased on the entire substituent groups in the reactants and as a result in the final silicone resin product produced by the present invention.

However, the above is the more specific substituent groups in the concentrations shown for producing silicone resin molding compositions with the optimum tensile strength in the cured state. It should be understood, however, regardless of the disclosure of the above preferred specific groups and ratios thereof in the halosilane reactants for preferred molding compositions that such organo groups in the instant process may be broadly any monovalent hydrocarbon radical and halogenated monovalent hydrocarbon radical.

It should also be understood that with respect to the organohalosilane reactants that may be utilized in the present process as disclosed above that as a result the final silicone resin product may have alkoxy substituent groups as well as silanol substituent groups before the curing of the silicone resin product.

It should also be appreciated that instead of a completely halogenated organohalosilane reactant there may be utilized partially alkoxylated organosilane reactants in which some of the halogen groups are substituted by alkoxy groups which as can be appreciated are readily hydrolyzable in the present process. Although not as desirable as is disclosed above, all of the halogen groups in the organosilane reactants may be substituted by hydrolyzable alkoxy groups and which organo akoxylated silanes can suitably be utilized as reactants in the present process.

In accordance with the present process, the organohalosilanes must be first mixed with a portion of acetone before being subjected to hydrolysis. The mixing of the organohalosilanes in the acetone prior to placing the organohalosilane mixture into the heterogeneous hydrolysis mixture is necessary to prevent a too rapid viscosity build-up in the reaction silicone resin product. Acetone acts as a protective medium for the organohalosilanes in this prior mixing procedure to allow the slow hydrolysis of the organohalosilanes with the water in the hydrolysis medium. The amount of acetone utilized to premix the organohalosilanes is not critical but any suitable amount of acetone that will act as a carrier for the organohalosilanes is acceptable.

A more critical aspect of the process of the present invention as disclosed above is that the organohalosilanes must be added to the heterogeneous hydrolysis mixture of water, acetone and a water-immiscible solvent over a period of at least 40 minutes, otherwise, there will be too high a viscosity build-up in the hydrolysis reaction and as a result the final silicone resin product will have a viscosity above the specified upper limit of 100 centipoise at 140° C.

Another critical part of the present process is the quantity and amount of the hydrolysis medium ingredients, that is, the water, acetone and water-immiscible organic solvent. These ingredients must be present in the quantities specified above in order to result in a heterogeneous hydrolysis medium and to produce a silicone resin with the desired properties.

In addition, it is also necessary that the immiscible organic solvent be selected from an immiscible organic solvent that has a boiling point that does not exceed about 120° C. This is necessary since in the final stripping procedure which will be discussed below, if the water-immiscible organic solvent is stripped off from the silicone resin product at the temperature much above 120° C., then there will again be an undesirable viscosity build-up in the silicone resin product. Examples of water-immiscible organic solvents suitable in the process of the present invention that have a boiling point of about 120° C. or below are for example, toluene, cyclohexane, and chlorinated hydrocarbon solvents.

Another critical aspect in the first step of the present process which is necessary for the production of a low viscosity silicone resin product with the desired physical properites, is that it is necessary to continually maintain the temperature of the heterogeneous hydrolysis mixture and the organohalosilane reactant feed stream below 45° C. This temperature limitation should be maintained preferably throughout the first step of the present process, that is, for some time even after the total amount of the organohalosilane reactant feed stream has been added to the heterogeneous hydrolysis mixture and preferably up to the separation of the water phase after complete hydrolysis of the organohalosilane reactants has taken place.

Cooling of the vessel containing the heterogeneous hydrolysis medium is usually necessary to maintain the temperature hydrolysis medium below 45° C. Most preferably, cooling is carried out of the hydrolysis vessel such that the heterogeneous hydrolysis medium is always maintained at room temperature or below.

It should be specified again that the manner of addition of the organohalosilane reactants to the heterogeneous hydrolysis mixture, as specified above, and the maintaining of the temperature of reaction during the first step of the present process is critical for producing a low viscosity silicone resin with the desired physical properties discussed previously.

After complete reaction has taken place between the organohalosilane reactants and the heterogeneous hydrolysis medium, the water layer may then be separated. Once the water layer is separated, it is then necessary to decrease the acid content of the silicone resin that is present in the organic solvent layer. For most purposes for which the silicone resin is to be utilized, it is desirable that in the final silicone resin product that the acid content does not exceed 5 parts per million. It is highly undesirable to decrease the acid content by the addition of a neutralizing agent such as, a base, since the presence of salts in such a silicone resin product also tends to deleteriously affect the physical properties of the final silicone resin in its cured state, especially, when such a silicone resin is utilized to form a molding composition. Many methods may be utilized to decrease the acid content in the organic solvent layer.

One preferred method is to wash the organic solvent layer with copious amounts of water. Preferably, an equal amount of water is added to the organic solvent layer with agitation for a period of time anywhere from 5 minutes to 30 minutes and then the layers are allowed to separate and then the water layer is discarded. Any number of such washings of the organic solvent layer with water may be carried out. In most cases, one such washing with water could be sufficient if accompanied by a filtration procedure as set forth hereinbelow. However, if a filtration procedure for acid removal filter is not utilized when the organic solvent layer may be repeatedly washed with water to remove acid until the acid content of the organic solvent layer does not exceed 5 parts per million. During the washing step, agitation is necessary with each washing for at least 5 minutes. In the first step of the process, agitation is also highly desirable during the addition of the organohalosilanes to the heterogeneous hydrolysis mixture. However, such agitation is not as necessary as the other requirements set forth in the above discussion of the first step of the present process in hydrolyzing the organohalosilanes.

After one washing step has been completed in accordance with the above disclosure, it is generally preferred in accordance with the present invention to filter the organic solvent layer through an acid removal filter such as, Fuller's earth, manufactured by Fuller Corp., Los Angeles, Calif., such that the organic solvent layer has an acid content that does not exceed 5 parts per million.

At this point, the silicone resin is present in the organic solvent layer as a final product. To obtain it at a higher concentration and in a more usable form and specifically for molding compositions, the water-immiscible solvent is then stripped off. As has been stated previously, it is highly desirable during such stripping step not to exceed a temperature of about 120° C. since if this upper temperature limit is exceeded then the viscosity of the silicone resin will be increased above the desired range of 100 centipoise at 140° C., as indicated previously.

Accordingly, the above stripping of the solvent is preferably carried out such that there results a final resin product of about 98 to 100% solids. The resulting silicone resin may then be cast and cooled whereupon a solid silicone resin is formed. The resulting solid may then be ground to a fine particle size where it is most readily usable in producing silicone resin molding compositions.

A silicone resin produced in accordance with the above process will have a viscosity that does not exceed 100 centipoise at 140° C. and can be utilized at concentrations as low as 15 to 20% and preferably 18 to 20% by weight of a total silicone resin molding composition to prepare a silicone resin molded part with a low coefficient of thermal expansion and with suitable physical properties. Such silicone resin molding compositions are produced by taking the particles of silicone resin, adding to them a filler and then a curing catalyst. Other ingredients such as, pigments, heat stabilizing additives, may be added to the composition to enhance its properties and for color effects. Fillers that are suitable are such fillers as fused silica, fumed silica, calcium carbonate, zinc oxide and etc. The catalyst system may be any type of catalyst system suitable for curing silicone resins at high temperatures and more specifically is a mixture of a lead compound such as, lead carbonate and a carboxylic acid anhydride.

Various details as to such silicone resin molding compositions are, for instance, disclosed in the U.S. patents of A. Alekna, U.S. Pat. No. 3,666,830 entitled Lead Compound Catalyzed Siloxane Resin System and U.S. Pat. No. 3,792,012 of J. Zdaniewski, entitled Silicone Resin Useful in Molding Compositions.

Accordingly, by utilizing the present process there is obtained silicone resin most suitable for forming silicone resin molding compositions that have a low viscosity at elevated temperatures such that the silicone resin molding composition will have a low coefficient of thermal expansion, as well as the desired tensile strength in the cured state.

As the result of the utilization of the silicone resin produced by the process of the present case, there results a silicone resin molding composition which is more readily utilizable because of its low viscosity at elevated temperatures in terms of filling the mold within the time sequence permitted in automated operations and also wherein the resulting silicone resin composition has a low coefficient of thermal expansion. As a result of these properties, this present silicone resin can be utilized to produce silicone resin molding compositions which can be used to encapsulate intricate electronic components in automated equipment with the production of few faulty parts.

The following example is meant to illustrate the invention but is not intended in any way or manner to limit the definition of the present invention. All parts are by weight.

EXAMPLE 1

There was prepared an organohalosilane mixture composed of 335 parts of methyltrichlorosilane, 593 parts of phenyltrichlorosilane, 72 parts of dimethyldichlorosilane. The organohalosilane reactant mixture and the acetone were charged in a dual feed through a common dip leg to the hydrolyzer wherein said hydrolyzer contained 900 parts of acetone, 900 parts of toluene and 3000 parts of water. It must be specified that the 900 parts of acetone mentioned previously was charged through the common dip leg to the hydrolyzer wherein the hydrolyzer contained another 900 parts parts of acetone. The additions of the organohalosilane mixture and acetone to the hydrolyzer was carried out in 45 minutes wherein the reaction temperature, that is, the hydrolysis medium in the hydrolyzer, was maintained below 45° C. continually through the addition with continued cooling of the hydrolyzer vessel. During and after the addition of the organohalosilane reactant and acetone to the hydrolyzer there was continued agitation and for 18 minutes after the completion of the addition with continued cooling to maintain the temperature of the hydrolysis medium below 45° C. At that time, the cooling and agitation was discontinued and the phases were allowed to separate and settle for 15 minutes. The acid water layer was then drawn off. At this time, there was added to the organic solvent layer 55 parts of water and the mixture was agitated for 5 minutes and allowed to settle for one hour. At the end of that time the bottom water layer was drawn off. After removal of the bottom water layer, the organic solvent layer was then filtered through Celite 545 and Fuller's earth immediately following the final separation from the wash water layer such that the organic solvent layer had an acid content of less than 5 parts per million. Lab data indicated that the filtered hydrolyzate had excellent stability but in order to maintain the viscosity of the final silicone resin product as low as possible it was desirable that the solvent be stripped off as soon as possible. Accordingly, then at 20 millimeters of vacuum and at a temperature of 120° C., the toluene was stripped off, such as to produce a silicone resin product at 98–100% solids. The resulting silicone resin was cast into solid form and cooled whereupon the solid silicone resin was then ground to 30 mesh particle size. Such silicone resin when tested had a puddle cure at 200° C. of over 20 minutes and it had a viscosity at 140° C. of 87 centipoise. This resin shall be referred to as Silicone Resin A.

A molding composition was prepared using Silicone Resin A mixed with other typical ingredients as indicated below:

| Ingredients | Parts by Weight |
| --- | --- |
| Silicone Resin A | 340 |
| Fused Silica Filler | 1320 |
| Fumed Silica Filler | 10 |
| ⅛ inch Glass Fiber | 280 |
| *Candillia Wax | 115 |
| Lead Carbonate | 3.6 |
| Benzoic Anhydride | 1.0 |
| Carbon Black, etc. | 0.05 |

*Tradename for a wax used as a mold release agent.

The above composition containing 20% of Silicone Resin A had the following physical properties after transfer molding and post baking the parts for four hours at 200° C.:

Flexure Strength: 11,000 psi
Moisture Resistance: 0.2%
Coefficient of linear thermal expansion: $25 \times 10^{-6}$ in/in/°C.

Prior art silicone molding compositions have a coefficient of linear thermal expansion of $50 \times 10^{-6}$ in/in/°C.

I claim:

1. A process for providing a molding composition having a low coefficient of thermal expansion during cure, comprising the steps of:
   I. first providing a silicone resin having a viscosity which does not exceed 100 centipoise at 140° by
      A. adding with continuous agitation a mixture of acetone and organohalosilanes over a period of at least 40 minutes to a heterogeneous hydrolysis mixture having a water phase and an organic phase wherein said organic phase is composed of water, acetone and a water-immiscible solvent where in the final heterogeneous hydrolysis mixture, per part by weight of organohalosilanes there is present:
         1. from at least 1.7 parts to about 10 parts of water;
         2. from about 0.2 to about 5 parts of acetone;
         3. from about 0.3 to about 5 parts of a water-immiscible organic solvent, and
         4. from 0 to about one mole of an aliphatic monohydric alcohol having from 1 to 8 carbon atoms per mole of halogen attached to the silicone atom of said organohalosilane;
      B. maintaining the temperature of said heterogeneous hydrolysis mixture below 45° C. during Step (A);
      C. removing the water from said heterogeneous hydrolysis mixture and reducing the acid content of the organic phase containing a formed silicone resin to below 5 parts per million; and
      D. stripping off the solvent at a temperature not to exceed about 120° C. to yield a polyorganosiloxane having an average ratio from about 1 to 1.8 organo radicals per silicon atom;
      said organohalosilanes in Step (A) are selected from the class consisting of
         a. a mixture of organotrihalosilane and diorganodihalosilane,
         b. a reaction product of an aliphatic monohydric alcohol having from 1 to 8 carbon atoms and a mixture of organotrihalosilane and diorganodihalosilane which reaction product may have up to one alkoxy radical substituted for each halogen radical in said organotrihalosilane and diorganodihalosilane; and
         c. a mixture of the reaction product of (b) and an organohalosilane selected from organotrihalosilane and diorganodihalosilane, and where the organo radicals of said organohalosilanes are selected from the class consisting of monovalent hydrocarbon radicals and halogenated monovalent hydrocarbon radicals;
   II. mixing said silicone resin with a filler and a catalyst effective for providing a curable silicone molding composition having a low coefficient of thermal expansion during such cure, wherein said silicone resin comprises 15 to 20 percent by weight of the total molding composition.

2. The process of claim 1 further comprising the step of premixing said organohalosilanes with from 0.9 to 5 parts of acetone immediately prior to hydrolysis in the base heterogeneous hydrolysis mixture.

3. The process of claim 1 wherein the final heterogeneous hydrolysis mixture contains from 2 to 6 parts of water, 0.3 to 2 parts of acetone and 0.6 to 2 parts of toluene.

4. The process of claim 1 wherein the water-immiscible organic solvent is selected from the class consisting of toluene, cyclohexane, and chlorinated hydrocarbon solvents having a boiling point that does not exceed about 120° C.

5. The process of claim 1 wherein (a), (b) and (c) said organo radical of the organotrihalosilane is either a methyl or a phenyl radical.

6. The process of claim 5 where in (a), (b), and (c) the organo radicals of said diorganodihalosilane is methyl and the mole percent of the diorganodihalosilane varies from 10 to 20 based on the entire mixture of organohalosilanes.

7. The process of claim 1 further comprising washing the water-immiscible solvent layer after the water layer is removed in (C) and then filtering the water-immiscible solvent layer to reduce the acid content to less than 5 parts per million.

8. The process of claim 1 where in Step (D) the resin solids are reduced to 98 to 100% solids and further comprising casting the resin solids to a solid form and crushing the solid mass that is formed upon cooling of the resin solids to form friable resin particles.

9. The process of claim 1 where in the silicone resin which is formed there is an organo substituent to silicone ratio that varies from 1:1 to 1:8.1 and the resin has a hot melt viscosity at 140° C. that varies from 50 to 100 centipoise.

10. The process of claim 1 further comprising the step of curing said molding composition.

11. The process of claim 1 wherein said filler is selected from the group consisting of fused silica, fumed silica, calcium carbonate and zinc oxide.

12. The process of claim 1 wherein said catalyst is a mixture of lead carbonate and a carboxylic acid anhydride.

* * * * *